(12) United States Patent
Lee et al.

(10) Patent No.: US 9,144,962 B2
(45) Date of Patent: Sep. 29, 2015

(54) GRAPHENE-POLYMER LAYERED COMPOSITE AND PROCESS FOR PREPARING THE SAME

(75) Inventors: Eun-kyung Lee, Seoul (KR); Byoung-lyong Choi, Seoul (KR); Choong-ho Yu, College Station, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 782 days.

(21) Appl. No.: 13/094,154

(22) Filed: Apr. 26, 2011

(65) Prior Publication Data

US 2012/0070612 A1   Mar. 22, 2012

(30) Foreign Application Priority Data

Sep. 17, 2010  (KR) .................. 10-2010-0091963

(51) Int. Cl.
*B32B 3/00* (2006.01)
*B32B 37/02* (2006.01)
(Continued)

(52) U.S. Cl.
CPC .............. *B32B 37/24* (2013.01); *B32B 9/007* (2013.01); *B32B 27/06* (2013.01); *B82Y 30/00* (2013.01); *H01B 1/04* (2013.01);
(Continued)

(58) Field of Classification Search
CPC ........ B32B 37/24; B32B 27/06; B32B 9/007; B32B 2037/243; B32B 2037/246; B32B 2457/00; B32B 2309/02; B32B 2309/105; H01B 1/04; B82Y 30/00; Y10T 428/31855; Y10T 428/24802; Y10T 428/24355; Y10T 156/10

USPC ................ 428/141, 408, 195, 220, 500, 688; 136/200, 205; 977/734
See application file for complete search history.

(56) References Cited

U.S. PATENT DOCUMENTS 6,096,454 A * 8/2000 Tran et al. .................. 429/231.8
7,605,188 B2 10/2009 Loh et al.
(Continued)

FOREIGN PATENT DOCUMENTS

JP    08-267647 A    10/1996
JP    11-070612 A    3/1999
(Continued)

OTHER PUBLICATIONS

JPO Website Machine English Translation of JP 08-267647. Inoue et al. Oct. 15, 1996.*
(Continued)

*Primary Examiner* — Maria Veronica Ewald
*Assistant Examiner* — Laura Auer
(74) *Attorney, Agent, or Firm* — Sughrue Mion, PLLC

(57) ABSTRACT

A graphene-polymer layered composite and a method of manufacturing the same is provided. A graphene-polymer layered composite includes polymer layers surrounding a graphene sheet, and may include numerous polymer layers and graphene sheets in an alternating stacked configuration. The graphene-polymer layered composite has the characteristics of a polymer in that it provides flexibility, ease of manufacturing, low manufacturing costs, and low thermal conductivity. The graphene-polymer layered composite also has the characteristics of graphene in that it has a high electrical conductivity. Due to the low thermal conductivity and high electrical conductivity, the graphene-polymer layered composite may be useful for electrodes, electric devices, and thermoelectric materials.

26 Claims, 3 Drawing Sheets

(51) Int. Cl.
  *B32B 37/24* (2006.01)
  *B32B 9/00* (2006.01)
  *B32B 27/06* (2006.01)
  *B82Y 30/00* (2011.01)
  *H01B 1/04* (2006.01)

(52) U.S. Cl.
  CPC .... *B32B 2037/243* (2013.01); *B32B 2037/246* (2013.01); *B32B 2309/02* (2013.01); *B32B 2309/105* (2013.01); *B32B 2457/00* (2013.01); *Y10T 156/10* (2015.01); *Y10T 428/24355* (2015.01); *Y10T 428/24802* (2015.01); *Y10T 428/31855* (2015.04)

(56) References Cited

U.S. PATENT DOCUMENTS

| | | | |
|---|---|---|---|
| 2007/0284557 A1* | 12/2007 | Gruner et al. | 252/500 |
| 2009/0068471 A1* | 3/2009 | Choi et al. | 428/408 |
| 2009/0117467 A1* | 5/2009 | Zhamu et al. | 429/231.8 |
| 2010/0159337 A1* | 6/2010 | Matsumoto et al. | 429/337 |

FOREIGN PATENT DOCUMENTS

| | | |
|---|---|---|
| JP | 2010-013340 A | 1/2010 |
| JP | 2010-070412 A1 | 4/2010 |
| KR | 10-2009-0048432 A | 5/2009 |
| KR | 10-2009-0065206 A | 6/2009 |
| KR | 10-2010-0031981 A | 3/2010 |

OTHER PUBLICATIONS

R.D. Cortright, et al.; "Hydrogen from catalytic reforming of biomass-derived hydrocarbons in liquid water"; 2002 Nature Publishing Group; vol. 418 No. 29; pp. 964-967.

Hicks, et al.; "Effect of Quantum-Well Structures on the Thermoelectric Figure of Merit", Physical Review B, May 1993, vol. 47, No. 19, 5 pages total.

* cited by examiner

GRAPHENE-POLYMER LAYERED COMPOSITE AND PROCESS FOR PREPARING THE SAME

CROSS-REFERENCE TO RELATED APPLICATIONS

This application claims priority from Korean Patent Application No. 10-2010-0091963, filed on Sep. 17, 2010 in the Korean Intellectual Property Office, the entire disclosure of which is incorporated herein in its entirety by reference.

BACKGROUND

1. Field

Apparatuses and methods consistent with embodiments relate generally to graphene-polymer layered composites and methods of preparing the same, and more particularly, to graphene-polymer layered composites having low thermal conductivity and high electrical conductivity and methods of preparing the same.

2. Description of the Related Art

In solid materials, heat energy is often transferred by lattice vibration, that is, phonons. The transferring capability of heat energy is represented by thermal conductivity. Thermal conductivity is dependent on either a mean free path of a phonon, which is affected by a thermal capacity characteristic, interior defects, and interface characteristics of a material, or a phonon group velocity. A thermal conductivity characteristic is a unique characteristic of a material, and in the case of a metal having many free electrons, heat is transferred by charges and thus, thermal conductivity is as high as hundreds of watts per Kelvin-meter (W/mK). In the case of a soft material that has no crystallinity in a wide temperature range, such as an organic material, or an amorphous material, phonon transfer is not easy and thus, thermal conductivity is as low as from about 0.1 to about 0.3 W/mK.

To solve the energy-related problems that future generations are to face, solar cells, hydrogen cells, and thermoelectric energy are getting much attention and are being extensively researched. Among them, the reuse of heat energy, which is wasted by 60% or more, and an energy conversion technique using solar heat are considered to be an important technique to be obtained. Since heat energy is used by converting heat into electrical energy, a material used in this heat conversion system needs to have low thermal conductivity and high electrical conductivity.

Polymers, such as thermoplastics or thermosetting polymers, are an attractive material in terms of flexibility, costs, and processability. However, as a thermoelectric material, polymer is not attractive due to its very low electrical conductivity despite its low thermal conductivity. Recently, however, the possibility of a polymer as a thermoelectric material has been demonstrated after a composite including the polymer and a nano material, such as a carbon nanotube (CNT) having high electrical conductivity, was developed. In this case, however, charge hopping may occur among CNTs in a CNT network and thus, there is a limit in improving electrical conductivity of the polymer.

SUMMARY

One or more exemplary embodiments provide polymer layered composites having low thermal conductivity and high electrical conductivity.

One or more exemplary embodiments also provide methods of preparing the polymer layered composites.

One or more exemplary embodiments also provide electrodes including the polymer layered composites.

One or more exemplary embodiments also provide electric devices including the polymer layered composites.

One or more exemplary embodiments also provide thermoelectric materials including the polymer layered composites.

According to one aspect of an exemplary embodiment, a graphene-polymer layered composite includes: two or more polymer layers; and one or more graphene layers formed between the polymer layers.

According to one aspect of an exemplary embodiment, a thickness of the graphene-polymer layered composite may be in a range of about 1 nanometer (nm) to about 1 micrometer (m).

According to one aspect of an exemplary embodiment, the graphene layer may further include a nanostructure.

According to one aspect of an exemplary embodiment, the nanostructure may have a surface on which metal particles are formed.

According to one aspect of an exemplary embodiment, the metal particles are metal nano particles or metal ions.

In another exemplary embodiment, an electrode, an electric device, and a thermoelectric material include the graphene-polymer layered composite described above.

In another exemplary embodiment, a method of preparing a graphene-polymer layered composite includes: positioning a graphene sheet on a first polymer layer to form a first graphene layer; and positioning a polymer sheet on the first graphene layer to form a second polymer layer.

According to one aspect of the exemplary embodiment, the method may further include positioning a graphene sheet on the second polymer layer to form a second graphene layer; and positioning a polymer sheet on the second graphene layer to form a third polymer layer.

In another exemplary embodiment, a method of preparing a graphene-polymer layered composite includes positioning a plurality of polymer layers and at least one graphene sheet in a stacked configuration, wherein one graphene sheet is positioned between each of the polymer layers.

The above and/or other aspects will be set forth in part in the description which follows and, in part, will be more apparent from the description of exemplary embodiments taken in conjunction with the accompanying drawings and the claims.

BRIEF DESCRIPTION OF THE DRAWINGS

These and/or other aspects will become apparent and more readily appreciated from the following description of the exemplary embodiments, taken in conjunction with the accompanying drawings of which.

Figure 1A:
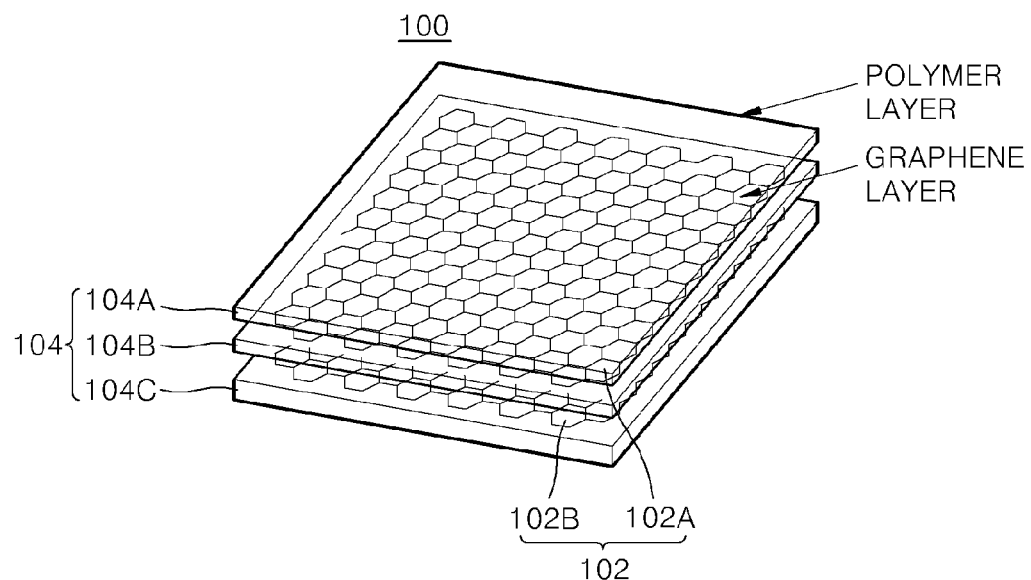
FIG. 1A is an exploded view of a grapheme-polymer layered composite, according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description.

A graphene-polymer layered composite according to one aspect of an exemplary embodiment may include two or more polymer layers and a graphene sheet formed between the polymer layers.

The term "graphene" used herein refers to a polycyclic aromatic molecule formed by covalently bonding a plurality of carbon atoms, in which the covalently-bonded carbon atoms have a repeating unit of 6-atom ring. In this regard, the covalently-bonded carbon atoms may further have a 5-atom ring and/or 7-atom ring.

Figure 1B:
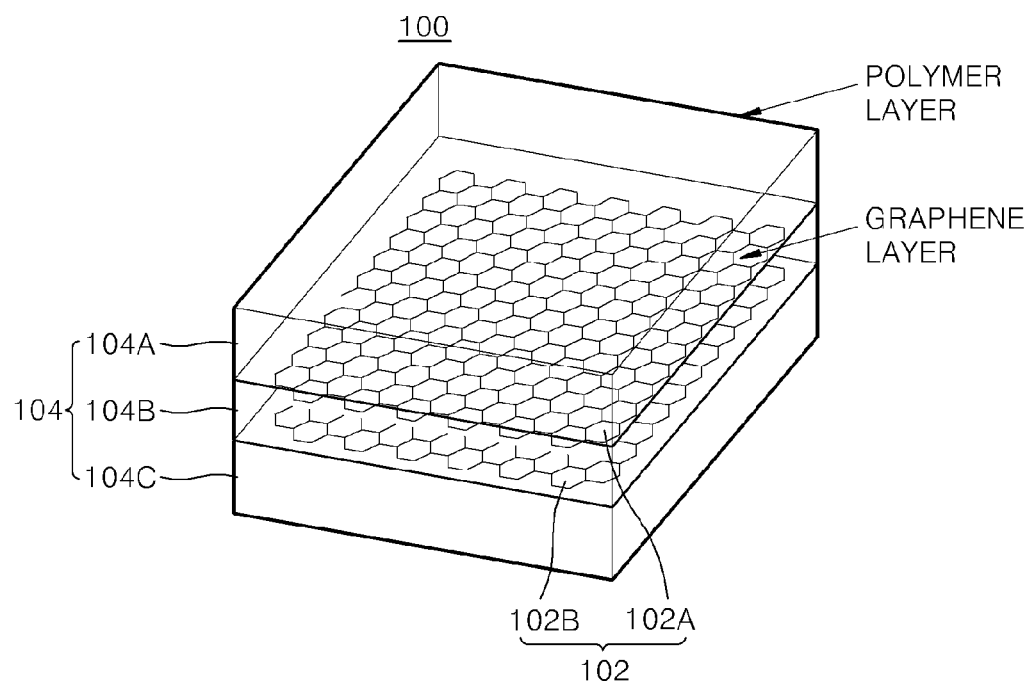
FIG. 1B is a schematic perspective view of the graphene-polymer layered composite, according to an exemplary embodiment.

FIGS. 1A and 1B are schematic views of a graphene-polymer layered composite 100 according to an exemplary embodiment. FIG. 1A is an exploded view of the graphene-polymer layered composite 100, and FIG. 1B is a schematic and perspective view of a graphene-polymer layered composite 100.

In the graphene-polymer layered composite 100 illustrated in FIGS. 1A and 1B, two graphene sheets 102A and 102B are alternately stacked between three polymer layers 104A, 104B and 104C. That is, in a graphene-polymer layered composite according to an exemplary embodiment, the number of polymer layers 104 may be from about 3 to about 300, and the number of graphene sheets 102 may be one less than the number of polymer layers. The polymer layers 104 and the graphene sheets 102 may be configured to be alternately stacked, and an upper most layer 104A and a lower most layer 104C of the graphene-polymer layered composite may be polymer layers.

A thickness of the graphene-polymer layered composite may be in a range of about 1 nanometer (nm) to about 1 micrometer (μm). With a composite of this thickness, a thickness of each of the polymer layers may be in a range of about 10 nm to about 100 nm.

The graphene sheet may be a mono-layered graphene sheet or a multi-layered graphene sheet. For example, each of the graphene sheets 102 may be a mono-layered graphene sheet with 1 layer, or a multi-layered graphene sheet including up to 300 layers. In one exemplary embodiment, the graphene sheet may have approximately 1 to 10 layers. Within the range of layers described above, electrical characteristics of graphene may be maintained.

An area of a graphene sheet including each of the graphene layers may be equal to or greater than 1 centimeter squared ($cm^2$). In addition, the graphene sheet including each of the graphene layers may have ten or less wrinkles per unit area of 1,000 micrometers squared ($\mu m^2$). In addition, the graphene sheet including each of the graphene layers may have at least 99% graphene per unit area of 1 millimeter squared ($mm^2$).

The polymer that constitutes the polymer layers may not be limited, and may be, for example, polyalkylene, polyacryl, polyester, polyamid, or polyurethane. For example, the polymer may be polyethylene, polymethyl methacrylate (PMMA), poly(N,N-dimethylacrylamid)(PDMA), or poly(3,4-ethylenedioxythiophene)(PEDOT).

The polymers that constitute the two or more polymer layers may be identical to or different from each other.

In a conventional polymer-carbon nanotube (CNT) composite, electron hopping may occur among CNTs, that is, electrical conductivity in a lengthwise direction of CNTs is good, but charge transferring among CNTs is difficult. Thus, the conventional polymer-CNT composite has insufficient electrical conductivity. However, a graphene-polymer layered composite, according to an exemplary embodiment, in which a graphene sheet is interposed between polymer layers has both low thermal conductivity, which is a characteristic of a polymer, and high electrical conductivity, which is a characteristic of graphene. Compared to conventional silicon (Si), graphene has high electron mobility, chemical stability, and a large surface area. In addition, graphene is a good conductive material having a thermal conductivity of 5000 watts per Kelvin-meter (W/mK); and when a polymer is composited with graphene, electrons transferred to graphene may move without electron hopping among CNTs—that is, without resistance, thereby increasing electrical conductivity of the composite.

In addition, compared to a composite in which graphene is dispersed in a polymer, the shape of graphene in the exemplary embodiments herein may be easily retained, and thus high electrical conductivity of graphene may be used.

According to another exemplary embodiment, the graphene sheet included in the graphene-polymer layered composite may include a nanostructure. The nanostructure may include at least one selected from the group consisting of a nanotube, a nanowire, and a nanorod. For example, the nanostructure may be a carbon nanotube.

The nanostructure may include a ligand or may be passivated.

Figure 2A:
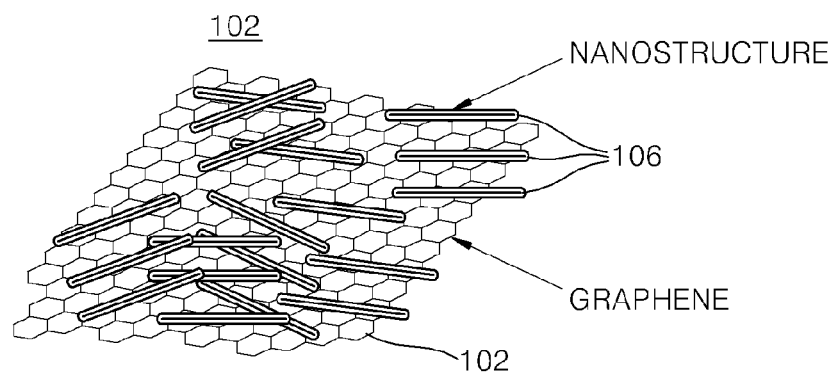
FIG. 2A is an illustration of a graphene layer with nanostructures formed thereon, according to an exemplary embodiment.
Figure 2B:
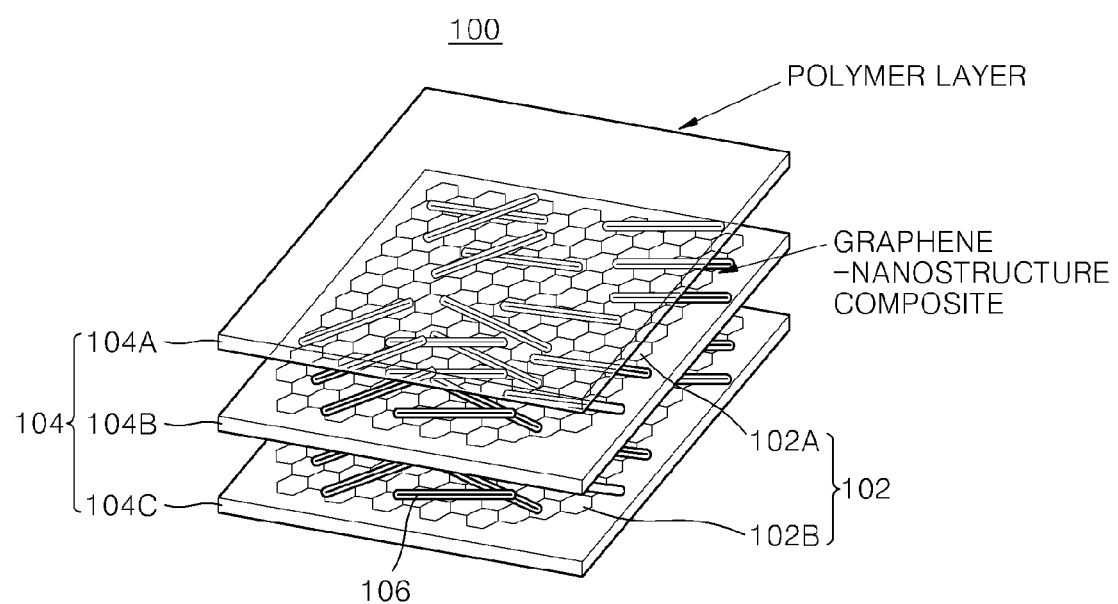
FIG. 2B is a schematic view of a graphene-polymer layered composite in which the nanostructure is formed therein, according to another exemplary embodiment.

FIGS. 2A and 2B are illustrations of the graphene-polymer layered composite in which the graphene sheet includes a nanostructure, according to another exemplary embodiment. FIG. 2A is a view illustrating nanostructures 106 formed on a graphene sheet 102, and FIG. 2B is a schematic view of a graphene-polymer layered composite 100 including the graphene sheets 102A and 102B on which nanostructures 106 are formed.

Each of the nanostructures 106 on the graphene sheet 102 may have a one-dimensional shape. The one-dimensional-shaped nanostructures may be formed to be electrically connected with graphene, and may be disposed perpendicular to the graphene sheet 102 or disposed at a certain angle. The one-dimensional-shaped nanostructures may be formed of various materials. For example, the nanostructures may be formed of a Group IV element, such as carbon (C), silicon (Si), or germanium (Ge); a Group III-V semiconductor; a Group II-VI semiconductor; a Group IV-VI semiconductor; or a Group IV-V-VI semiconductor. The nanostructures may also be formed of semiconductor oxide, such as zinc oxide (ZnO), nitride semiconductor, or metal. However, the material that is used to form the nanostructures is not limited thereto, and the nanostructures may also be formed of various other materials. Also, the nanostructures may have a heterostructure in which different components are combined; for example, a heterostructure according to a radial direction or a lengthwise direction.

When the graphene sheet is a multi-layered graphene sheet, the nanostructures may be formed between the layers of the multi-layered graphene sheet. In this case, the number of nanostructures formed between the layers of the multi-layered graphene sheet may vary, and each of the nanostructures may be formed to be electrically connected with the multi-layered graphene sheet.

In addition, to improve electrical conductivity of the graphene-polymer layered composite, metal particles may be formed on surfaces of the nanostructures formed on the graphene sheet. The metal particles may be metal nano particles or metal ions with a size of about 10 angstroms (Å) to about 100 nm. Such metal particles may include at least one metal selected from the group consisting of a transition metal, a lanthanide, a Group 13 element, and a Group 14 element, in which boron, carbon, and silicon, which are non-metals, are excluded from the group. Such metal particles may include at least one metal selected from the group consisting of gold (Au), nickel (Ni), iron (Fe), silver (Ag), aluminum (Al), germanium (Ge), gadolinium (Gd), copper (Cu), indium (In), and lead (Pb), but are not limited thereto.

Figure 3:
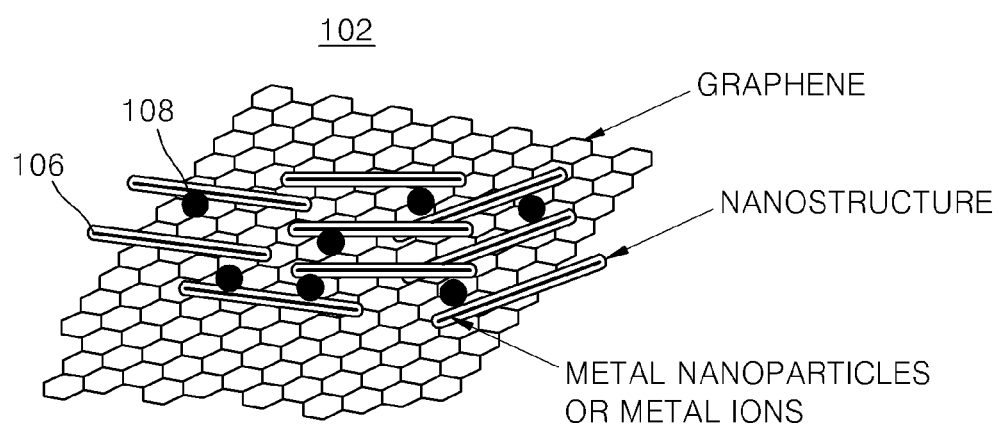
FIG. 3 is a schematic view of graphene including nanostructures having surfaces on which metal particles are formed, according to another exemplary embodiment.

FIG. 3 is a schematic view of a graphene sheet 102 on which nanostructures 106 including metal particles 108 are formed.

An average size of the metal particles may be about 500 nm or less; for example, in a range of about 1 nm to about 100 nm, about 1 nm to about 10 nm, or about 2 nm to about 5 nm.

The graphene-polymer layered composite according to the exemplary embodiments may be used in economical and easily manufacturable cells, electric articles, and thermoelectric materials.

In another exemplary embodiment, a method of forming the graphene-polymer layered composite is provided, in which the method includes positioning a graphene sheet on a first polymer layer to form a first graphene-polymer layer; and positioning a second polymer layer on the first graphene sheet to form a second graphene-polymer layer. The combined structure of the first polymer layers surrounding the graphene sheet thus comprises the graphene-polymer layered composite.

In addition, the method may further include positioning a second graphene sheet on the second polymer layer to form a third graphene-polymer layer; and positioning a third polymer layer on the second graphene sheet to form a fourth graphene-polymer layer, wherein the forming of the third graphene-polymer layer and the forming of the fourth graphene-polymer layer may be repeatedly performed until a (n−1)th graphene sheet and a nth polymer layer are formed, wherein n is an integer between about 4 to 10,000.

The graphene sheet may be formed by using a conventional graphene sheet preparation method. An example of the conventional graphene sheet preparation method will now be described in detail.

Graphene sheet preparation methods can be largely classified into a mechanical method or a chemical method.

An example of a mechanical method is the use of an adhesive tape for producing a thin graphene sheet. In this case, adhesive tapes are attached to opposite sides of a graphite particle and then pulled in opposite directions of the graphite particle, thereby separating the graphite particle. When this process is repeatedly performed, a thin graphene sheet may be obtained.

According to a chemical method, a graphitizing catalyst is formed on at least one surface of a substrate, and a carbonaceous material as a carbon supplier is brought into contact with the resultant substrate. Then, the substrate is heat treated under inert or reducing atmospheres, thereby forming a graphene sheet on the graphitizing catalyst.

The formation of the graphitizing catalyst on the substrate may be performed by using a conventional metal coating method, and may not be limited thereto. For example, a vapor deposition method, such as sputtering, a chemical vapor deposition (CVD), or a vapor e-beam deposition may be used to form the graphitizing catalyst on the substrate. Any of various methods that are used to form a uniform layer of catalyst metal may be used. Alternatively, the graphitizing catalyst may be formed in a high-precision pattern shape by printing or photolithography.

According to the method of forming a graphitizing catalyst pattern by photolithography, for example, a graphitizing catalyst is deposited on the entire surface of a substrate, and then a photoresist layer is formed thereon. A photomask is located close to the photoresist layer, and exposure and etching processes are performed thereon to form a high-precision pattern shape. If the graphitizing catalyst is formed to have a certain pattern on a substrate, graphene may correspondingly be formed in the same pattern.

After the graphitizing catalyst is formed on the substrate, the carbonaceous material is brought into contact with the graphitizing catalyst. The contact process of the carbonaceous material may be any one of (a) coating a carbon-containing polymer as the carbonaceous material on the substrate on which the graphitizing catalyst pattern is formed; (b) loading a vapor carbonaceous material as the carbonaceous material onto the substrate on which the graphitizing catalyst pattern is formed; (c) immersing the substrate on which the graphitizing catalyst pattern is formed in a liquid carbonaceous material as the carbonaceous material and performing a pre-heat treatment process thereon.

If the graphitizing catalyst layer formed on the substrate is removed by, for example, heat treatment, a graphene pattern directly contacts the substrate. However, if such a treatment is not performed, the substrate, the graphitizing catalyst layer, and a graphene pattern may be sequentially present in this stated order.

The substrate on which the graphene pattern is formed may be, but is not limited to, an inorganic substrate, such as a Si substrate, a glass substrate, or GaN substrate; a plastic substrate, such as PET, PES, or PEN; or a metallic substrate, such as Ni, Cu, or W.

The graphitizing catalyst layer may be formed of a graphitized metal catalyst which may have a polycrystal structure or a single crystal structure. When a polycrystal graphitized metal catalyst is used, a catalyst layer may be easily formed at low costs. When a single crystal graphitized metal catalyst is used, formation of grains, which occurs when a polycrystal structure is used, does not occur. Thus, graphene may be formed at uniform speeds on the entire surface of the substrate and a homogeneous graphene pattern may be formed.

The formation of a homogeneous graphene pattern may be confirmed through a Laman spectrum, for example, by the presence of a D band. In a Laman spectrum, the D band indicates whether the graphene has defects. For example, if a peak intensity of the D band is strong, this may be interpreted as the presence of many defects in the graphene. If a peak intensity of the D band is low or zero, this may be interpreted as the presence of few defects in the graphene.

Regarding a graphene sheet formed by using a deposition formation method using the graphitized metal catalyst, a peak ratio of D band/G band may be 0.2 or less, 0.01 or less, 0.001 or less, or 0 ("zero"), at which the graphene has no defects.

The graphitized metal catalyst may promote carbon atoms to be combined with each other to form a hexagonal planar sheet, and examples thereof may include a catalyst used in synthesizing graphite, a catalyst used in inducing carbonization, and a catalyst used in manufacturing CNTs. For example, the graphitized metal catalyst may be at least one metal selected from the group consisting of Ni, Co, Fe, Pt Au, Al, Cr, Cu, Mg, Mn, Mo, Rh, Si, Ta, Ti, W, U, V, and Zr, or an alloy thereof.

The single crystal graphitized metal catalyst may be prepared by single-crystallizing the metal or alloy as described above. However, a commercially available single crystal metal may also be used herein. In general, a commercially-available single crystal metal has a rod shape, and the rod-shaped single crystal metal may be sliced in a sheet shape for use herein.

The carbonaceous material that is brought into contact with the graphitizing catalyst to form the graphene may be any one of various carbonaceous materials having various structures and compositions. However, to form a high-density graphite layer, the coated carbonaceous material needs to have a high density. Such a carbonaceous material may be a carbon-containing polymer, a vapor carbonaceous material, or a liquid carbonaceous material.

If a carbon-containing polymer is used as the carbonaceous material, any of various carbon-containing polymers may be used without limitation. For example, a self-assembled polymer enables formation of a high-density graphene pattern because the self-assembled polymer is regularly aligned on a catalyst surface in a direction perpendicular to the catalyst surface.

The self-assembled polymer that forms a self-assembled layer may include at least one self-assembled polymer selected from the group consisting of an amphiphilic polymer, a liquid crystal polymer, and a conductive polymer.

The amphiphilic polymer aligns in a certain direction in an aqueous solution due to inclusion of a hydrophilic group and a hydrophobic group therein. For example, the amphiphilic polymer may have a Langmuir-Blodgett alignment, a dipping alignment, or a spin alignment. The amphiphilic polymer may include at least one hydrophilic group selected from the group consisting of an amino group, a hydroxyl group, a carboxyl group, a sulfate group, a sulfonate group, a phosphate group, or a salt thereof; and at least one hydrophobic group selected from the group consisting of a halogen atom, a C1-C30 alkyl group, a C1-C30 halogenated alkyl group, a C2-C30 alkenyl group, a C2-C30 halogenated alkenyl group, a C2-C30 alkynyl group, a C2-C30 halogenated alkynyl group, a C1-C30 alkoxy group, a C1-C30 halogenated alkoxy group, a C1-C30 heteroalkyl group, a C1-C30 halogenated heteroalkyl group, a C6-C30 aryl group, a C6-C30 halogenated aryl group, a C7-C30 arylalkyl group, and a C7-C30 halogenated arylalkyl group. Examples of the amphiphilic polymer include a capric acid, a lauric acid, a palmitic acid, a stearic acid, a myristoleic acid, a palmitoleic acid, an oleic acid, a stearidonic acid, a linolenic acid, a caprilic amine, a lauryl amine, a stearyl amine, and an oleyl amine.

The liquid crystal polymer is aligned in a certain direction in a liquid. The conductive polymer has such a characteristic that when dissolved in a solvent, the conductive polymer forms a layer, and when the solvent is evaporated, the conductive polymer is self-aligned to form a certain crystal structure. Due to this characteristic, the conductive polymer may have a dipping alignment or a spin coating alignment. Examples of the conductive polymer include polyacetylene, polypyrrol, polythiophene, polyaniline, polyfluorene, poly (3-hexylthiophene), polynaphthalene, poly(p-phenylene sulfide), and poly(p-phenylene vinylene).

Also, a polymer that is automatically aligned in a certain orientation when deposited from a vapor source material may also be used herein, such as, for example, a conductive polymer that is formed by deposition. Examples of such a conductive polymer include acene and a derivative thereof, anthracene and a derivative thereof, heteroanthracene (for example, benzodithiophene, or dithienothiophene) and a derivative thereof, tetracene and a derivative thereof (for example, halogenated tetracene, a tetracene derivative having a polar substituent, a tetracene-thiophene hybrid material, rubrene, or alkyl- or alkoxy-substituted tetracene), heterotetracene and a derivative thereof, pentacene and a derivative thereof (for example, alkyl- and halogen-substituted pentacene, aryl-substituted pentacene, alkynyl-substituted pentacene, alkynyl-substituted alkyl and alkynyl pentacene, or alkynyl-substituted pentacene ether), heteropentacene and a derivative thereof, and heteroacene and a derivative thereof.

The carbon-containing polymer may have at least one polymerizing group such as a carbon-carbon double bond or a carbon-carbon triple bond. The polymerizing group may induce polymerization between polymers in a polymerization process such as ultraviolet-light irradiation after a layer is formed. Since a carbonaceous material obtained therefrom has a high molecular weight, evaporation of carbon during a subsequent heat treatment may be prevented.

The polymerization process of the carbon-containing polymer may be performed before or after the carbon-containing polymer is coated on the graphitizing catalyst. That is, if polymerization among the carbon-containing polymer is induced before the carbon-containing polymer is coated on the graphitizing catalyst, a polymerization film obtained through a separate polymerization process may be transferred to the graphitizing catalyst to form a carbonaceous material layer. The polymerization process and the transferring process may be repeatedly performed a few times to control a thickness of the graphene sheet.

The carbon-containing polymer is aligned on the graphitizing catalyst by using various coating methods, such as Langmuir-Blodgett, dip coating, spin coating, or vacuum deposition. By using such coating methods, the carbon-containing polymer may be coated on the entire surface of the substrate or selectively coated on the graphitizing catalyst layer.

If the carbon-containing polymer is selectively coated on the graphitizing catalyst layer, the carbon-containing polymer may have a pattern similar or identical to the graphitizing catalyst pattern. Even when the carbon-containing polymer is coated on the entire surface of the substrate, in a subsequent heat treatment process, a carbon-containing polymer that is coated on a portion of the substrate on which the graphitizing catalyst is absent may not receive aid from the graphitizing catalyst. Thus, the carbon-containing polymer may thermally decompose to evaporate or remain as an amorphous carbon. The amorphous carbon may be selectively removed in a subsequent process.

Also, a molecular weight, a layer thickness, or the number of self-assembled layers of the carbon-containing polymer which are aligned on the substrate may be controlled according to a target number of graphene sheets. That is, the higher molecular weight the carbon-containing polymer has, the more graphene sheets are formed due to a high carbon content. The greater the thickness of the carbon-containing polymer pattern, the more graphene sheets are formed and the greater the thickness of the graphene layer. As described above, a thickness of the graphene layer is controlled by adjusting a molecular weight of a carbon-containing polymer.

As an example of the self-assembled organic material, an amphiphilic organic material includes a hydrophilic site and a hydrophobic site. The hydrophilic site of the amphiphilic organic material is bonded to the graphitizing catalyst that is hydrophilic and uniformly aligned on the graphitizing catalyst layer. The hydrophobic site of the amphiphilic organic material is exposed away from the substrate and is bonded to an amphiphilic organic material that is not bonded to the graphitizing catalyst layer; for example, a hydrophilic site of another amphiphilic polymer. If the amount of the amphiphilic organic material is sufficient, the amphiphilic organic material is sequentially deposited on the graphitizing catalyst layer due to such a hydrophilic-hydrophobic bond. These are sequentially bonded to form a plurality of layers, and then heat treated to form a graphene layer. Accordingly, since the number of layers of graphene is controllable by adjusting a thickness of a formed organic material film that is obtained by selecting an appropriate amphiphilic organic material and adjusting the amount thereof, a graphene pattern having a thickness appropriate for purposes described herein may be manufactured.

Also, a vapor carbonaceous material used as a supplier of the carbonaceous material may form graphene by thermal decomposition caused by contacting the graphitizing catalyst on the substrate. As described above, the vapor carbonaceous material may be any material that supplies carbon and exists in a vapor state at a temperature equal to or higher than 300° C. The vapor carbonaceous material may be any material that includes carbon, and the number of carbon atoms in the vapor carbonaceous material may be 6 or less, 4 or less, or 2 or less. Examples of the vapor carbonaceous material may include at least one material selected from the group consisting of carbon monoxide, methane, ethane, ethylene, ethanol, acetylene, propane, propylene, butane, butadiene, pentane, pentene, cyclopentadiene, hexane, cyclohexane, benzene, and toluene.

The vapor carbonaceous material may be loaded at a certain pressure into a chamber in which the graphitizing catalyst is present, and the chamber may contain only the vapor carbonaceous material; or an inert gas, such as helium or argon, may also be present together therewith.

In addition, in combination with the vapor carbonaceous material, hydrogen may also be used. Hydrogen may be used to control a vapor reaction by maintaining a surface of the graphitized metal catalyst clean, and the amount of hydrogen may be in a range of about 5 to about 40 volume %, about 10 to about 30 volume %, or about 15 to about 25 volume %, based on the total volume of the chamber.

Also, regarding a liquid carbonaceous material used as the carbonaceous material, the liquid carbonaceous material contacts the substrate on which the graphitizing catalyst is formed, and then, carbon that is decomposed by pre-heat treatment permeates into the graphitizing catalyst by carburization. The contacting may be performed by, for example, immersion.

The liquid carbonaceous material may be an organic solvent, and may be any material that includes carbon and is thermally decomposable in the presence of the graphitizing catalyst. For example, the liquid carbonaceous material may be a polar or non-polar organic solvent having a boiling point of about 60° C. to about 400° C. The organic solvent may be an alcohol organic solvent, an ether organic solvent, a ketone organic solvent, an ester organic solvent, or an organic acid organic solvent. For example, the organic solvent may be an alcohol organic solvent or an ether organic solvent in terms of adsorption and reactivity with respect to the graphitized metal catalyst, and a reduction capability. The alcohol organic solvent may be a monovalent alcohol, a polyhydric alcohol, or a combination thereof. Examples of the monovalent alcohol include propanol, pentanol, hexanol, heptanol, and octanol, and examples of the polyhydric alcohol include propylene glycol, diethylene glycol, dipropylene glycol, triethylene glycol, tripropylene glycol, octylene glycol, tetraethylene glycol, neopentyl glycol, 1,2-butandiol, 1,3-butandiol, 1,4-butandiol, 2,3-butandiol, and dimethyl-2,2-butandiol-1,2, and dimethyl-2,2-butandiol-1,3. The monovalent alcohol and the polyhydric alcohol may include, in addition to a hydroxyl group, ether group.

The liquid carbonaceous material may be used alone or in combination with a base. If a base is used in combination, carburization may be performed quickly and thus a graphene pattern formation time may be reduced, and viscosity of the liquid carbonaceous material is increased to be able to control cohesion of particles. The base may be used alone, or in combination of water in consideration of solubility of the base. The base may be an organic base and/or an inorganic base, such as, tetramethyl ammonium chloride (TMAH), sodium hydroxide, or potassium hydroxide. A concentration of the base may not be limited, and may be in a range of about 0.01M (mol/L) to about 5.0M in the organic solvent. If the concentration of the base is less than 0.01M, a carburization speed is low and cohesion of particles may not be able to be controlled. If the concentration of the base is greater than 5.0M, the viscosity of the liquid carbonaceous material is too high and particles may not be separated in the organic solvent and particle cleaning may be difficult.

When the liquid carbonaceous material is used, carburization may be performed by pre-heat treatment. By the pre-heat treatment, the liquid carbonaceous material thermally decomposes in the presence of the graphitizing catalyst. The thermal decomposition of the liquid carbonaceous material in the presence of the graphitizing catalyst is disclosed by R. D. CORTRIGHT et al., "Hydrogen from catalytic reforming of biomass-derived hydrocarbons in liquid water," Nature, Aug. 29, 2002, vol 418, page 964, MacMillan Publishers (incorporated herein by reference in its entirety). A thermal decomposition result of an organic solvent, such as a polyhydric alcohol, is alkane, $H_2$, $CO_2$, or $H_2O$, and the graphitizing catalyst is carburized with the carbon component from among the thermal decomposition results.

The pre-heat treatment for thermal decomposition may be performed by stirring the liquid carbonaceous material and the graphitizing catalyst until the liquid carbonaceous material and the graphitizing catalyst are sufficiently mixed, and the pre-heat treatment may be performed at a temperature of about 100° C. to about 400° C. for about 10 minutes to 24 hours. If the pre-heat treatment temperature is lower than 100° C., the organic solvent may insufficiently thermally decompose. If the pre-heat treatment temperature is higher than 400° C., particles may melt and cohere. If the pre-heat treatment time is less than 10 minutes, the organic solvent may not sufficiently thermally decompose, and if the pre-heat treatment timer is greater than 24 hours, further heat treatment effects may not occur and the manufacturing costs may be increased.

Also, by controlling a degree of carburization in the carburization process as described above, a carbon content of the graphitizing catalyst is controlled, and thus, in the subsequent graphene preparation process, a thickness of a graphene layer may also be controllable. For example, when an easily decomposable material is used as the liquid carbonaceous material in the decomposition process, more carbon is generated from the liquid carbonaceous material, thereby enabling the graphitizing catalyst to be carburized with a great amount of carbon. In addition, if the carburization process is controlled by adjusting the heat treatment temperature and time, the amount of carbon added into the graphitizing catalyst is controlled and accordingly, formation of graphene may also be controlled. Accordingly, a thickness of the graphene layer that constitutes the graphene pattern may be easily controlled.

The graphene sheet may have a stack structure of a plurality of layers, and the number of layers that forms the stack structure may be in a range of about 1 to 300 or about 1 to 60. If the number of layers is greater than 300, such a stack structure is defined as a graphite instead of graphene, which is outside the scope of the exemplary embodiments.

After a carbonaceous material, such as a carbon-containing polymer, a liquid carbonaceous material, or a vapor carbonaceous material, is brought into contact with a graphitizing catalyst, the carbonaceous material is graphitized by heat treatment. The heat treatment may be performed under an inert atmosphere or a reduction atmosphere to prevent oxidation of components that constitute the carbonaceous material. Due to the heat treatment, carbon atoms in an organic material are covalently bonded to each other to form, for example, a hexagonal planar structure, thereby forming graphene on the substrate.

The heat treatment temperature may be at a temperature of about 400° C. to about 2,000° C., and if the heat treatment temperature is lower than 400° C., sufficient graphitization may not occur, and if the heat treatment temperature is higher than 2,000° C., carbon is likely to evaporate. The heat treatment time may be in a range of, for example, about 1 second to 10 hours, and if the heat treatment time is outside the range described above, sufficient graphitization may not occur or heat treatment effects may not occur and the manufacturing costs may be increased.

As a heat source for the heat treatment, induction heating, irradiation heat, lasers, IR, microwaves, plasma, ultraviolet (UV) light, or surface Plasmon may be used without limitation.

The heat treatment result may be subjected to a cooling process. The cooling process is performed so that formed graphene uniformly grows and is regularly aligned. In the cooling process, growth of graphene in the heat treatment process is stopped to produce a graphene sheet. If the cooling process is performed too slow, graphene growth may continue during cooling and thus a uniform graphene growth control may not be obtained. Accordingly, the cooling rate may be in a range of about 0.1° C. to about 10,000° C. per minute, for example, about 1.0° C. to about 1,000° C. per minute. Such a cooling rate may be obtained by natural cooling. The natural cooling may be obtained by simply removing the used heat source, which is enough to obtain a cooling rate of 1,000° C. or more per minute. In addition, to increase the cooing rate, a cooling gas, such as Ar, $H_2$, or $N_2$, may also be used.

When the graphene formation process as described above is performed, a graphitizing catalyst layer and graphene may be sequentially present on at least one surface of a substrate. In this regard, the graphitizing catalyst layer may not be removed, or, if necessary, removed by acid treatment so that the graphene is directly bonded to the substrate.

An area of the graphene sheet obtained using the method described above may be easily adjusted by controlling the size of the substrate on which the graphitizing catalyst is formed, and a wide-area graphene sheet may be easily formed. That is, a large substrate, for example, a substrate with a size of 1 mm×1 mm or more, or a size in a range of 1 mm×1 mm to 1,000 mm×1,000 mm may be used. However, a size of the substrate is not limited herein. That is, a large graphene sheet may be obtained by forming a graphitizing catalyst on a substrate by using various methods and then performing the subsequent process described above thereon. Accordingly, the size of a graphene sheet is controllable by adjusting only the size of a substrate. In this regard, the substrate may be silicon substrate, but is not limited thereto.

A graphene sheet with a controlled area as described above may have a horizontal length and a vertical length of 1 mm or more, 10 mm or more, or 10 mm to 1,000 mm. However, since there is no limit on the size of the substrate, the size of a formed graphene sheet may also be unlimited. For example, a substrate is wound in a roll shape and the roll-shaped substrate is continuously used in generating graphene, thereby forming a very long graphene sheet having a roll-shape. The horizontal and vertical lengths may be applied for a square-shaped sheet, and in the case of an irregular-shape sheet, horizontal and vertical lengths may be appropriately defined. For example, regarding an irregular-shape sheet, a portion having the longest length is defined as a horizontal length and a portion having the smallest length is defined as a vertical length. If a graphene sheet is circular, the horizontal and vertical lengths may be defined as a diameter of a circle, and if a graphene sheet is oval, a longer axis and a shorter axis are defined as a horizontal direction and a vertical direction, respectively.

The graphene sheet that constitutes the graphene layer may have 10 or less wrinkles per unit area of 1,000 $\mu m^2$, 5 or less wrinkles per unit area of 1,000 $\mu m^2$, or 3 or less wrinkles per unit area of 1,000 $\mu m^2$. In addition, the graphene sheet may have an area of 1 $mm^2$ or more, for example, an area in a range of about 1 $mm^2$ to about 100 $m^2$ or in a range of about 1 $mm^2$ to about 25 $m^2$. In the graphene sheet, graphene is present in 99% or more area per unit area of 1 $mm^2$, for example, 99% to 99.999% per unit area of 1 $mm^2$. Within the range described above, the graphene may be homogenously present, and thus the graphene has a uniform electrical characteristic.

The wrinkle of graphene may be formed either when graphene is separated or transferred from a graphitizing catalyst metal layer in a graphene preparation process, or when graphene does not uniformly grow at a certain site in a graphene growth process. Also, a larger graphene sheet is more likely to have wrinkles, and less winkle may lead to formation of more uniform graphene, and thus, electrical characteristics of graphene may be increased.

A graphene sheet prepared as described above is located on a polymer layer to form a graphene layer, and through a heat treatment process performed at a temperature of 200° C. or less, adhesion characteristics between the polymer and graphene may be improved.

A thickness of the graphene sheet may be in a range of about 1 Å(angstrom) to about 10 nm, and a thickness of the polymer layer may be in a range of about 10 nm to about 1 μm.

In one exemplary embodiment, a polymer layer is positioned on the graphene sheet to form another graphene-polymer layer.

If the graphene layer includes nanostructures, a graphene sheet including a nanostructures is formed by using the following method and then positioned on the polymer layer.

First, a substrate is prepared. The substrate may be, for example, a silicon substrate or a glass substrate, but is not limited thereto. Then, graphene is located on the substrate. The graphene has a few nm-thickness thin planar structure in which carbon atoms are two-dimensionally aligned. A metal catalyst layer is formed on the graphene. The metal catalyst layer may function as a seed layer for growing a one-dimensional shape-nanostructure, which will be described later. Accordingly, a material that is used to form the metal catalyst layer may be selected in consideration of a material that is used to form a nanostructure that is to grow. Also, after the metal catalyst layer is formed, the metal catalyst layer may be patterned. If the metal catalyst layer is patterned, density or size of a nanostructure that is to grow may be controlled.

The one-dimensional shape-nanostructure is grown from the metal catalyst layer. The growth of nanostructure may be performed by using a dry process, such as chemical vapor deposition (CVD) or a wet process in which nanostructures grow in a solution. Through the growth processes, one-dimensional shape-nanostructures are formed on the graphene.

The graphene sheet having a surface on which metal particles are formed may be used to produce a graphene-polymer layered composite.

A graphene-polymer layered composite prepared using the method described above may have the characteristics of a polymer, such as flexibility, ease of manufacturing, low manufacturing costs, and low thermal conductivity, and also have the characteristics of graphene, such as a high electrical conductivity. Due to the characteristics, the graphene-polymer layered composite may be useful for electrodes, electric devices, and thermoelectric materials.

Hereinafter, an exemplary embodiment will be described in detail. However, the exemplary embodiment is presented for illustrative purposes only and does not limit the scope of the invention.

Example 1

A nickel layer having a thickness of 300 nm was formed as a graphitizing catalyst by depositing nickel using an e-beam evaporator on a 3 cm×3 cm silicon substrate coated with a $SiO_2$ layer having a thickness of 100 nm.

The silicon substrate on which the $SiO_2$ layer and the nickel layer were formed was located in a chamber heated at a temperature of 1,000° C., and a mixed gas including methane/hydrogen/argon was loaded into the chamber at a flow rate of 50/65/200 sccm (standard cubic centimeters per minute) for 3 minutes. Then, argon gas was supplied thereto with cooling the reaction product at a cooling rate of 10° C. per second until the temperature was decreased to room temperature, thereby producing graphene including two to five graphene sheets on the graphitizing catalyst.

Subsequently, the substrate on which the graphene sheet was formed was immersed in a 1M $FeCl_3$ solution for 10 minutes so as to remove the nickel layer, thereby separating the graphene sheet from the substrate.

A polymer was spin coated or dip coated on a glass substrate or a silicon substrate, or poured into a template and then, heat treated at a temperature of 300° C. or less to form a polymer layer. Then, the graphene sheet prepared above was placed on the polymer layer, or heat treated at a temperature of 200° C. or less to fix the graphene sheet on the polymer layer, thereby forming a graphene-polymer layer. Another polymer layer was placed on the graphene sheet in the same manner as described above, and another graphene sheet was stacked thereon.

As described above, according to the one or more of the above exemplary embodiments, a graphene-polymer layered composite has both low thermal conductivity, which is a characteristic of a polymer, and high electrical conductivity, which is a characteristic of graphene. In addition, electrical conductivity of the graphene-polymer layered composite may be further enhanced by forming nanostructures on the graphene sheet, such as a nanowire or nanostructures having surfaces on which metal particles are formed. The graphene-polymer layered composite has flexibility, ease of manufacturing, low manufacturing costs, and low thermal conductivity, which are characteristics of a polymer, as well as high electrical conductivity due to the graphene sheet.

In addition, by using the graphene-polymer layered composite having low thermal conductivity and high electrical conductivity, batteries, electric devices, and thermoelectric materials may be easily manufactured at low costs.

It should be understood that the exemplary embodiments described therein should be considered in a descriptive sense only and not for purposes of limitation. Descriptions of features or aspects within each embodiment should typically be considered as available for other similar features or aspects in other exemplary embodiments.

What is claimed is:

1. A graphene-polymer layered composite comprising:
   two or more polymer layers; and
   a graphene sheet formed between the polymer layers,
   wherein a thickness of the graphene-polymer layered composite is in a range of about 1 nanometer (nm) to about 1 micrometer (μm).

2. The graphene-polymer layered composite of claim 1, wherein the graphene-polymer layered composite comprises about 3 to 300 polymer layers and about 2 to 299 graphene sheets, wherein the graphene sheets are alternately formed between the polymer layers.

3. The graphene-polymer layered composite of claim 1, wherein the graphene sheet is a multi-layered graphene sheet with approximately 2 to 10 graphene layers.

4. The graphene-polymer layered composite of claim 1, wherein the polymer layer comprises one or more polymers selected from a group consisting of polyethylene, poly(3,4-ethylenedioxythiophene), polyaniline, polymethyl methacrylate, and poly(N,N-dimethylacrylamid).

5. The graphene-polymer layered composite of claim 1, wherein the graphene sheet further comprises at least one nano structure connected with the graphene sheet.

6. The graphene-polymer layered composite of claim 5, wherein the nanostructure comprises one or more nanostructures selected from a group consisting of a nanonanotube, a nanowire, and a nanorod.

7. The graphene-polymer layered composite of claim 5, wherein the nanostructure comprises one material selected from a group consisting of a Group IV semiconductor, a Group III-V semiconductor, a Group II-VI semiconductor, a Group IV-VI semiconductor, a Group IV-V-VI semiconductor, a semiconductor oxide, a semiconductor nitride, and a metal.

8. The graphene-polymer layered composite of claim 5, wherein the at least one nanostructure further comprises a ligand or is passivated.

9. The graphene-polymer layered composite of claim 5, wherein metal particles are formed on a surface of the at least one nanostructure.

10. The graphene-polymer layered composite of claim 9, wherein the metal particles are metal nano particles or metal ions.

11. The graphene-polymer layered composite of claim 1, wherein each of the graphene sheets comprises at least one graphene layer, and wherein the graphene sheet has an area of 1 $cm^2$ or more.

12. The graphene-polymer layered composite of claim 1, wherein each of the graphene sheets comprises a maximum of about 10 wrinkles per unit area of 1,000 $\mu m^2$.

13. The graphene-polymer layered composite of claim 1, wherein each of the graphene sheets has graphene in at least 99% per unit area of 1 $mm^2$.

14. An electrode comprising the graphene-polymer layered composite of claim 1.

15. An electric device comprising the graphene-polymer layered composite of claim 1.

16. A thermoelectric material comprising the graphene-polymer layered composite of claim 1.

17. A method of preparing a graphene-polymer layered composite comprising two or more polymer layers and a graphene sheet formed between the polymer layers, wherein a thickness of the graphene-polymer layered composite is in a range of about 1 nanometer (nm) to about 1 micrometer (μm), the method comprising:
  positioning a first graphene sheet on a first polymer layer to form a first graphene-polymer layer; and
  positioning a second polymer layer on the first graphene sheet to form a second graphene-polymer layer.

18. The method of claim 17, further comprising:
  positioning a second graphene sheet on the second polymer layer to form a third graphene-polymer layer; and
  positioning a third polymer layer on the second graphene sheet to form a fourth graphene-polymer layer.

19. The method of claim 18, wherein a subsequent graphene sheet and subsequent polymer layer are repeatedly positioned upon one another until a (n−1)th graphene sheet and an nth graphene-polymer layer are formed, wherein n is an integer between 4 to 10,000.

20. The method of claim 17, wherein the first graphene sheet comprises a mono-layered graphene sheet or a multi-layered graphene sheet.

21. The method of claim 20, wherein the first graphene sheet is a multi-layered graphene sheet with approximately 2 to 10 graphene layers.

22. The method of claim 17, wherein the first graphene sheet is formed using a vapor method, a polymer method, or a liquid method.

23. The method of claim 17, wherein the first graphene sheet further comprises at least one nanostructure connected with the graphene sheet.

24. The method of claim 23, wherein metal particles are formed on a surface of the at least one nanostructure.

25. A method of preparing a graphene-polymer layered composite comprising two or more polymer layers and a graphene sheet formed between the polymer layers, wherein a thickness of the graphene-polymer layered composite is in a range of about 1 nanometer (nm) to about 1 micrometer (μm), the method comprising:
  positioning the polymer layers and the graphene sheet in a stacked configuration, so that one graphene sheet is positioned between each pair of the polymer layers.

26. The graphene-polymer layered composite of claim 1, wherein the graphene-polymer layered composite is formed by stacking one of the polymer layers, the graphene sheet, and another one of the polymer layers in this order, so that the one of the polymer layers is positioned on one side of the graphene sheet and the another one of the polymer layers is positioned on another side of the graphene sheet which is positioned surrounded by the polymer layers.

* * * * *